Figure 1:
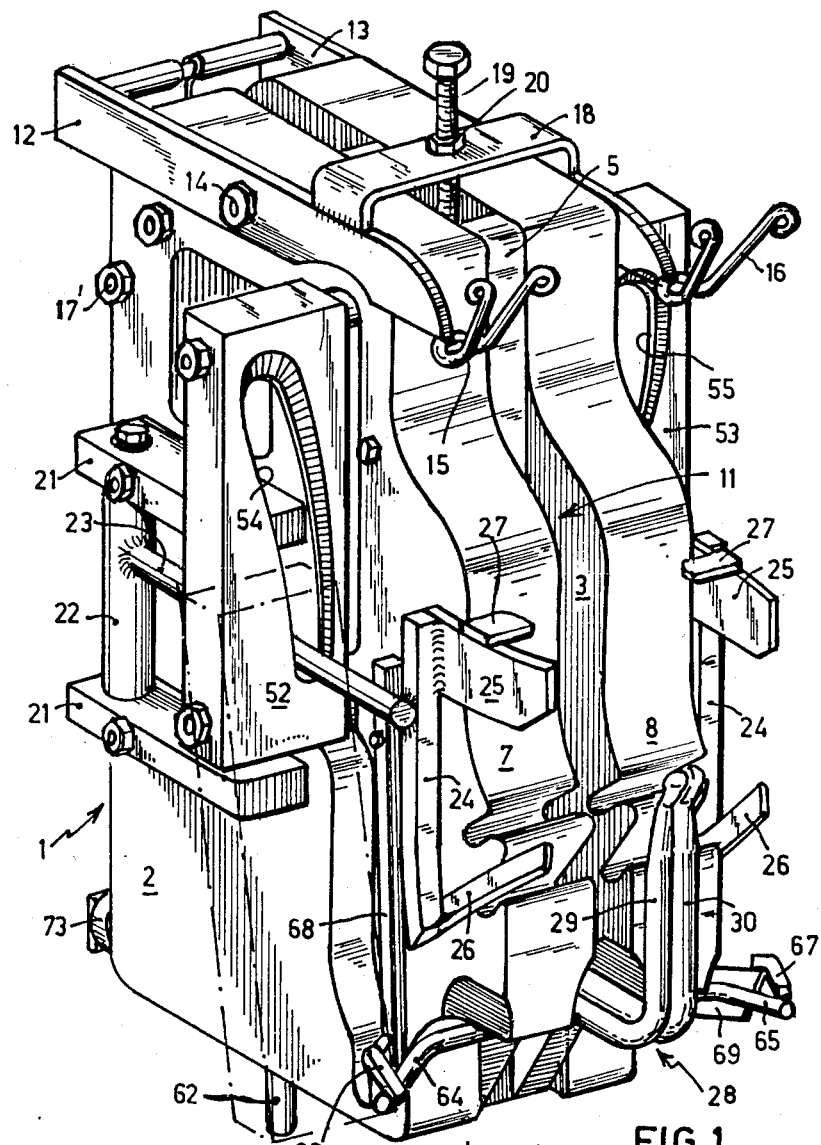

United States Patent [19]

Tieleman

[11] Patent Number: 4,683,616
[45] Date of Patent: * Aug. 4, 1987

[54] STRETCHING MECHANISM OF A DEVICE FOR CUTTING SLAUGHTERED POULTRY

[75] Inventor: Edward J. Tieleman, Doesburg, Netherlands

[73] Assignee: Linco Holland Engineering B.V., Doesburg, Netherlands

[ * ] Notice: The portion of the term of this patent subsequent to Mar. 19, 2002 has been disclaimed.

[21] Appl. No.: 712,778

[22] Filed: Mar. 18, 1985

Related U.S. Application Data

[63] Continuation of Ser. No. 456,180, Jan. 6, 1983, Pat. No. 4,505,002.

[51] Int. Cl.4 ............................................. A22C 21/00
[52] U.S. Cl. ...................................................... 17/11
[58] Field of Search ............................................ 17/11

[56] References Cited

U.S. PATENT DOCUMENTS 4,505,002   3/1985   Tieleman ........................ 17/11

Primary Examiner—Willie G. Abercrombie
Attorney, Agent, or Firm—Beveridge, DeGrandi & Weilacher

[57] ABSTRACT

A stretching mechanism of a device for cutting slaughtered poultry, said mechanism being provided with a support surface for the bird, with means to hang the bird by the legs, with means to hold the wings of the bird and with means to hold the trunk on the support surface, said trunk holding means including gripper means which engage the spine of the bird. According to the invention the gripper means consist of a symmetrical centering fork and that the centering fork and the support section are guided movably in two directions relative to each other in a plane, perpendicularly to the support surface, wherein in the operative end position the centering fork engages the spine at the inside of the trunk of the bird.

9 Claims, 3 Drawing Figures

U.S. Patent  Aug. 4, 1987  Sheet 1 of 2  4,683,616

STRETCHING MECHANISM OF A DEVICE FOR CUTTING SLAUGHTERED POULTRY

This is a continuation of co-pending application Ser. No. 456,180, filed on Jan. 6, 1983, now U.S. Pat. No. 4,505,002, issued Mar. 19, 1985.

The present invention relates to a stretching mechanism of a device for cutting slaughtered poultry, said mechanism being provided with a support section with a support surface for the bird, with means to hang the bird by the legs, with means to hold the wings of the bird and with means to hold the trunk on the support surface, said trunk holding means including gripper means which engage the spine of the bird.

Such a stretching mechanism is known from European patent application No. 81.200079, laid open to public inspection. In this known stretching mechanism the gripper means which are destined to engage the spine of the bird, consists of two transverse grippers, which are secured in the configuration of a lying U to support arms, pivotable in a horizontal plane, which support arms may be moved towards and away from each other by means of a cam plate with two cam slots. So said transverse grippers should, as it were, engage with the legs of the U between two ribs of the bird laterally on its substantially vertically disposed spine and the chance that one or more legs of the U-shaped grippers engage on a rib, and do not sufficiently engage the spine itself, is relatively large, so that the centering function of these grippers relative to the spine is more or less poor. Moreover there is the chance that because the spine is more or less curved, the grippers cannot or can hardly engage the bird's spine. Finally the known grippers cannot or can hardly exert any forces on the spine in the direction of the support surface of the bird, which derogates from their centering effect. The consequence of a faulty centering operation is that the knife which cuts the slaughtered bird lengthwise in two halves, cannot accuarately cut the spine in two halves, so that in the one half a relatively small part of the spine is present, or that the spine is not present at all, whereas in the other half a relatively large part of the spine is present, or that the spine is present wholly, which may considerably deminish the selling value of these halves, also because then relatively large differences in weight may be caused. Another disadvantage is that the U-shaped grippers damage the bird, and that even one or more ribs may be broken.

The invention tends to abolish the above described disadvantage of the known stretching mechanism.

This object is achieved in that in accordance with the invention the gripper means consist of a symmetrical centering fork and that the centering fork and the support section are guided movably in two directions relative to each other in a plane, perpendicularly to the support surface, wherein in the operative end position the centering fork engages the spine at the inside of the trunk of the bird.

Owing to the applied symmetrical centering fork, which engages the spine of the bird at the inside of the trunk, the spine, which has an acute V-shaped cross-section, is perfectly centered in the operative end position of the centering fork and moreover by means of the centering fork the spine is forced in a plane, which is perpendicular to the support surface for the bird, in the direction of said support surface, which will benefit the centering effect of the fork.

In a preferred embodiment of the stretching mechanism of the invention the support section is mounted fixedly in the stretching mechanism and the centering fork is guided, movable relative to the support surface, parallely and perpendicularly to the support surface. The guided movement of the centering fork in two directions towards the support surface and away therefrom can easily be realised and can be performed in a reliable manner.

In a very efficient embodiment of the stretching mechanism of the invention the symmetrical centering fork is provided with two parallel teeth with a round cross-section, having a taperingly thinning section at their free ends, ending into a semi-spherical head and which engage at both sides of the spine in their operative position.

Upon the movement of the centering fork toward the operative end position first the spherical heads and the tapering sections contact the spine, whereas subsequently the round teeth engage the spine over at least a part of their length. Hereby a gradual centering of the spine is created, which increases the effect of the centering fork considerably, and moreover because of the spherical heads and the round cross-section of the teeth the danger of damaging the bird is reduced to a minimum.

The invention will be further elucidated with an embodiment on the basis of the drawings.

Figure 3:
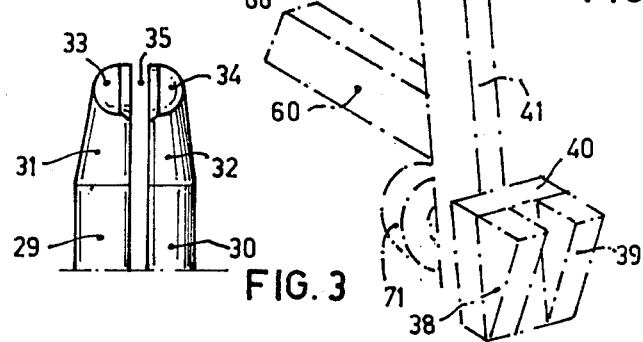
Figure 2:
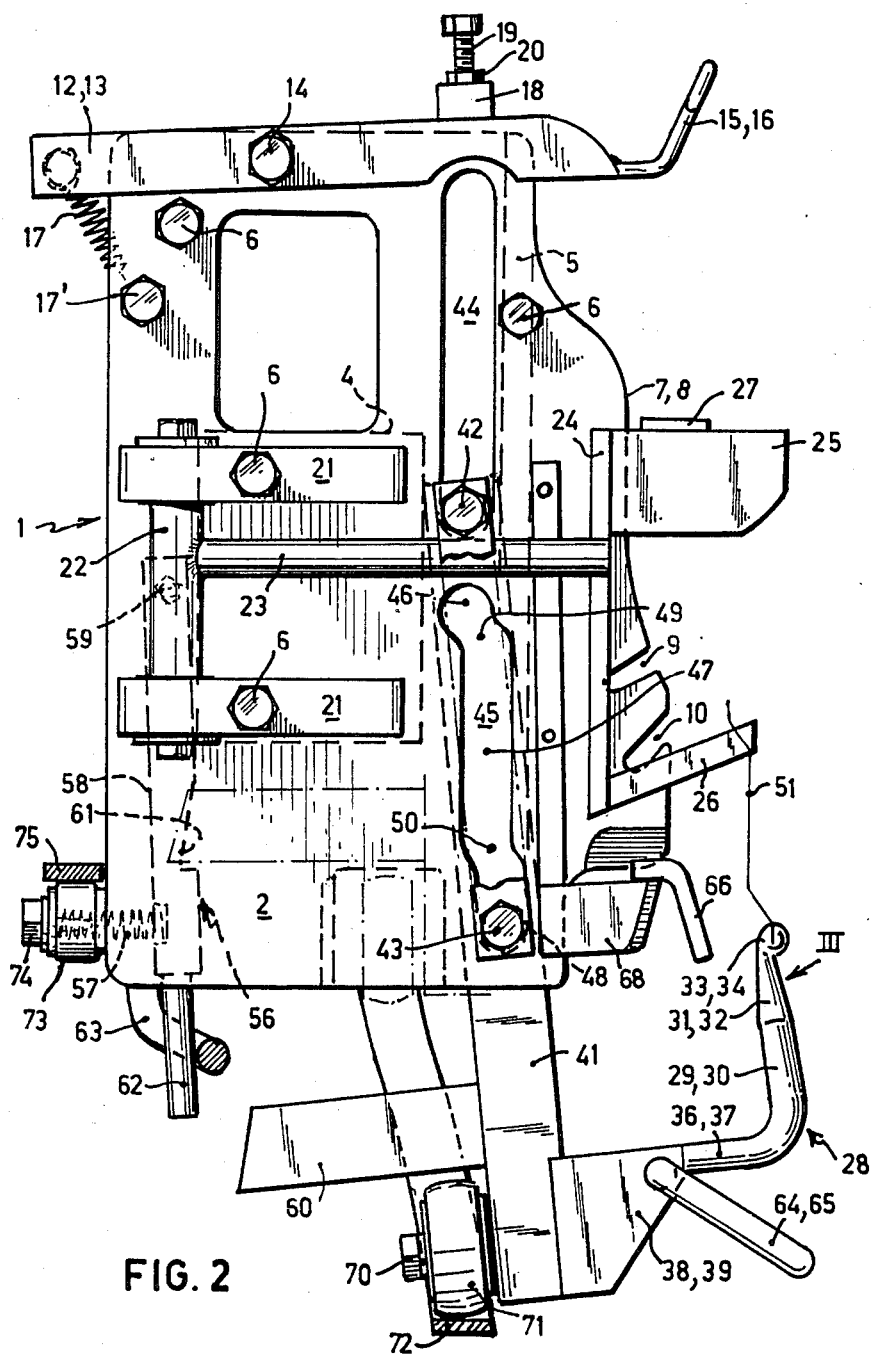

FIG. 1 is a perspective view of the stretching mechanism of the invention in the operative end position of the centering fork;

FIG. 2 in a side view of the stretching mechanism of the invention in the inoperative position of the centering fork and FIG. 3 is a view of the centering fork in accordance with arrow III in FIG. 2.

The stretching mechanism of the invention is provided with a frame 1, which consists of two parallel plates 2 and 3 of strong, wear-resistant and preferably hygenic material, preferably nylon. Between the plates 2 and 3 two or more spacer elements 4 and 5 are placed, and the plates 2 and 3 are fixedly interconnected by bolts 6. if necessary, spacer rings are placed on the bolts 6 between the plates 2 and 3. In the same manner as with the stretching mechanism of European patent applcation No. 81.200079 the plates 2 and 3 are secured to the free end of a radial processing arm of a device for cutting slaughtered poultry, said device being provided with various, for instance eight, processing arms with stretching mechanisms, disposed in the configuration of a roundabout (not illustrated).

In FIG. 2, at their right-hand side surface, also forming the radial outer surface of the stretching mechanism, the plates 2 and 3 are provided with a support surface 7 and 8 respectively, for the back of the bird, which extends along the major part of the height of the plates 2 and 3. In the support surface 7, 8 recesses 9 and 10 are provided, into which knives for cutting loose parts of the slaughtered bird are adapted to move, and the knife to cut the bird longitudinally in two parts can move through the slot 11 between the support surfaces of the frame plates 2 and 3.

At its upper side the stretching mechanism is provided with a hanging device, consisting of a double two-armed lever 12 and 13, which is pivotal on a transverse shaft 14, protruding through plates 2 and 3, and said lever being provided at its outside with U-shaped hanging hooks 15, 16 for the legs of the bird and at the inside it is provided with a pull spring 17, which at the one end is secured to the lever 12, 13 and tends to turn same in anti-clockwise direction, and at the other end it is secured to a transverse pin 17'. On the lever 12, 13 a clip 18 is secured, which is provided with a setting srew 19 with a counter nut 20, with which the pivoted movement of the lever 12, 13 can be restricted.

At both sides of the frame plates 2 and 3 a pair of support blocks 21 is provided which are secured with the aid of continuous bolts 6. Between the support blocks 21 a transverse shaft 22 is mounted, which is provided with a radial support arm 23, onto which at its free end a transverse bar 24 is secured, carrying at its upper end a support plate 25 for the rump parts and at its lower end a support bar 26 for the trunk of the bird. On the support plate 25 an inwardly directed retainer plate 27 is secured, which when a bird is hanging with its legs in the hanging hooks 15 and 16, presses at the interior onto the rump parts of the bird to prevent the legs of the birds from being drawn further upwardly by the hooks 15, 16, after these legs have been cut off by one of the knives. Thereby the knife for cutting the lower legs from the rump parts can act on the legs at the correct place.

In accordance with the invention the stretching mechanism is provided with a symmetrical centering fork 28, which is movably guided in a plane perpendicular to the support surface 7, 8 of the bird, so in a plane parallel to the plane of the drawing in FIG. 2, as will be further elucidated hereinafter, and which in its operative end position, illustrated in FIG. 1 in drawn lines, engages the spine at the inside of the bird's trunk. The centering fork 28 moves from the inoperative position, illustrated in drawn lines in FIG. 2, via an opening in the bird's chest into its trunk in the operative position in accordance with FIG. 1.

In accordance with the invention the symmetric centering fork 28 is provided with two parallel teeth 29 and 30 with a round cross-section having a taperingly thinning section 31 and 32 respectively at their free end, said section ending into a semi-spherical head 33 and 34 respectively, and which, in the operative postion of FIG. 1, engage at both sides of the sectionally acute, V-shaped spine of the bird. From FIG. 3 it appears that the two parallel teeth 29 and 30, the tapering sections 31 and 32 and the semi-spherical heads 33 and 34 define a narrow gap 35, having the same width along its entire length. This gap serves to let the knife (not illustrated) pass to cut the bird longitudinally in two halves. The gap 35 has a width of ±5 mm and the knife has a thickness of ±3 mm. The two parallel teeth 29 and 30 and/or the tapered sections 31 and 32 are possibly flattened at the inside then. In the operative position of the centering fork 28 the acute, V-shaped spine of the bird protrudes into the gap 35.

By means of a square headed section 36 and 37 respectively, the teeth 29 and 30 are secured onto triangular supports 38 and 39 respectively, which are secured in their turn, for instance welded, onto a support plate 40, which is mounted on the lower end of a guide bar 41.

In accordance with the invention the guide bar 41 is provided with two parallel transverse bars 42 and 43 which are vertically spaced. The upper transverse bar 42 is vertically slidable up and down in an upper straight slot 44 in the two frame plates 2 and 3, which is substantially parallel to the major part of the support surface 7, 8 of the bird. The lower transverse bar 43 is slidable in a lower slot 45 in the two frame-plates 2 and 3, consisting of three straight setions 46, 47 and 48, which are parallel to the upper slot 44 and which extend in a staggered manner relative to each other and are interconnected by transition sections 49 and 50 of the same width. The upper section 46 of the lower slot 45 is substantially aligned with the upper slot 44 and the two other straight sections 47 and 48 are each time laterally displaced relatively to the preceding section, such that the distance between the centering fork 28 and the bearing surface 7, 8, measured in horizontal direction in the plane of movement of the centering fork 28, increases upon movement of the fork from the operative position of FIG. 1 to the inoperative position of FIG. 2.

In the operative position of FIG. 1 the transverse bars 42 and 43 are located in the upper ends of the slot 44 and 45 respectively, and in the inoperative position of FIG. 2 the transverse bars 42 and 43 are located in the lower ends of the slot 44 and 45 respectively, as appears from FIG. 1 and 2.

The course described by the centering fork 28 upon its movement from the position of FIG. 2 into the position of FIG. 1 (drawn lines), is indicated at 51 in FIG. 2.

At both sides of the frame plates 2 and 3 a cam plate 52 and 53 respectively, is secured on the transverse bars 42 and 43, which cam plates are provided with a cam slot 54 and 55 respectively, through which the support arms 23 protrude. Upon movement of the centering fork 28 from the inoperative position of FIG. 2 into the operative position of FIG. 1, the support arms 23 are turned inwardly by the cam slots 54 and 55, so that the support plates 25 and the support bars 26 are forced onto the bottoms and the trunk respectively of the bird.

In accordance with the invention a mechanism 26 is provided in front of the centering fork 28, locking the fork in the operative position of FIG. 1. The locking mechanism 56 consists of a locking bar 58, loaded by a compression spring 57, said bar being pivotably mounted at 59 between the frame plates 2 and 3, of a tooth-shaped locking cam 60, which is secured to the guide bar 41 and which, in the operative end position of the centering fork 28, engages in a notch 61 in the locking bar 58, and of an unlocking pin 62 at the locking bar 58, cooperating with an unlocking cam 63 on the frame (not illustrated) of the cutting device. The toothshaped locking cam 60 has a somewhat smaller thickness than the distance between the plates 2 and 3, so that they guide the cam 60 practically without tolerance and thereby the centering fork 28 is held transversely in the correct position relative to the bird's spine.

According to the invention, partially laterally protruding closure clips 64 and 65, which are partially downwardly folded at an angle of ±75°, are secured to the triangular supports 38 and 39 of the centering fork 28, which closure clips, in the operative end position of the fork 28, cooperate with fixed wing hooks 66 and 67, which are secured to clips 68 and 69, fixedly mounted on the frame plates 2 and 3. The closure clips 64 and 65 enclose the cut-off wings of the bird under the fixed hooks 66 and 67, so that they cannot fall arbitrarily from the stretching mechanism.

At the lower end of the guide bar 41, opposite the centering fork 28, a roll 71, rotatable about a horizontal shaft, is secured. When the preceding bird is hung with its legs in the hooks 15 and 16 and hooked under the fixed hooks 66 and 67 with its wings, the roll 71 arrives on a guide 72 after a certain rotation of the processing arm of the cutting device (not illustrated), so that the guide bar 41 with the centering fork 28 moves upwardly and simultaneously pivots in clockwise direction in FIG. 2, until the operative position, illustrated in FIG. 2 in dotted lines and in FIG. 1 in drawn lines, is reached.

At the interior of the stretching device, near the lower edge of the frame plates 2 and 3, two freely rotatable rolls 73 are mounted on shafts 74, secured in frame plates 2 and 3, and when the centering fork 28 is brought into the operative position, wherein also the support arms 23 with the support plates 25 and the support bars 26 have to be forced upon the slaughtered bird, said rolls 73 cooperate with a fixed guide 75 on the frame of the cutting device (not illustrated) which prevent the processing arm and/or other parts of the cutting device (not illustrated) from being permanently bent or otherwise deformed by the pressure of the guide 72 on the roll 71 when the centering fork 28 is moved upward and the support arms 23 are forced inwardly.

For clarification's sake FIG. 1 shows in dotted lines a section of the centering fork 28 and the pertaining guide bar 41 is illustrated in its inoperative position, whereas in FIG. 2 in dotted lines a part of the locking mechanism 56 and the actuation cam 71 is illustrated in the operative position.

In the stretching mechanism of the invention the frame plates 2 and 3, the transverse bars 42 and 43, the roll 71 and the rolls 73 are preferably made of nylon, whereas the remaining parts of the stretching mechanism are preferably made of stainless steel.

Although in the above description a preferred embodiment of the stretching mechanism of the invention is described, wherein the centering fork 28 is movably guided in two directions into the frame plates 2 and 3 of the support section, it is also possible in accordance with the invention to mount the centering fork 28 in a fixed manner relative to the processing arm and to guide (a part of) the support section, on which the bird is stretched, by means of guide tracks and follower rolls in a plane perpendicular to the support surface 7, 8, in a movable manner in two directions relative to the fixed centering fork 28. With such an embodiment (not illustrated) of the stretching mechanism the same effect can be obtained as with the above described preferred embodiment, also illustrated in the drawing, of the stretching mechanism of the invention.

What is claimed is:

1. A stretching mechanism for holding a bird in a machine which cuts slaughtered poultry, said mechanism being provided with a support surface for the bird, means for hanging the bird by its legs, means for holding the wings of the bird, and trunk holding means for holding the trunk against the support surface, said trunk holding means including two members which are operable to hold the bird against the support surface at two spaced apart locations while the bird is being cut, means for producing relative movement between the trunk holding means and the support surface to move the trunk holding means in a path which is inside the trunk of the bird and extends toward the support surface, said trunk holding means being movable to and from an operative end position at which said two members engage the inside of the trunk of the bird at two spaced locations on opposite sides of the bird to hold the opposite sides of the bird's trunk against said support surface.

2. A stretching mechanism according to claim 1 wherein the support surface is mounted fixedly in the stetching mechanism, and the trunk holding means is movable in directions which lie parallel and perpendicular to the support surface.

3. A stretching mechanism according to claim 1 wherein said two members are two parallel teeth each having a round cross-section and having a tapering thinning section at its free end, and a semi-spherical head at the end of each tapering section.

4. A stretching mechanism according to claim 3, wherein the parallel teeth, the tapering sections and the semi-spherical heads define a narrow gap having a substantially constant width along its entire length.

5. A stretching mechanism according to claim 1 wherein a guide bar is secured to the trunk holding means, two vertically spaced parallel transverse bars connected to the guide bar, guide means including an upper slot and a lower slot which receive and guide the transverse bars, one said slot being oriented to cause the distance from said two members to the support surface to become smaller as the members move toward said operative end position, said transverse bars being located in the upper ends of the slots when the trunk holding means is in said operative end position, and a mechanism for locking the guide bar in position when the trunk holding means is at its operative end position.

6. A stretching mechanism according to claim 5 wherein the upper slot is a straight slot which is substantially parallel to a major section of the support surface, said lower slot having three straight sections which are parallel to the upper slot, the uppermost said straight section being aligned with the upper slot, and the two other said straight sections being laterally displaced relative to the uppermost section so that the distance from said two members to the support surface increases in response to movement of the trunk holding means in a direction away from its operative end position.

7. A stretching mechanism according to claim 5 wherein the guide bar has a lower end provided with a follower roll, a stationary guide cam means for engaging the follower roll and moving the guide bar, said locking mechanism having a pivoted spring-loaded locking bar with a notch therein, locking cam means mounted on the guide bar for engaging the notch in the locking bar when the trunk holding means is in its operative end position, an unlocking cam on the machine, and an unlocking pin means mounted on the locking bar and being engageable by said unlocking cam to move the locking bar until the locking cam is released from said notch.

8. A stretching mechanism according to claim 5 wherein the wing holding means includes fixed hooks for the wings of the bird and closure clips which are secured to the guide bar, said closure clips cooperating with the fixed wing hooks to retain the wings when the trunk holding means is in its operative end position.

9. A stretching mechanism according to claim 5 provided with pivotal support arms for supporting the bottom parts and the trunk of a bird respectively, two cam plates with cam surfaces for actuating said support arms, said cam plates being located on both sides of the guide bar and being secured to the transverse bars to actuate said support arms.

* * * * *